United States Patent
Patel et al.

(10) Patent No.: US 12,113,600 B2
(45) Date of Patent: Oct. 8, 2024

(54) DETERMINATION OF CANDIDATE SET OF BEAMS FOR BEAM TRACKING

(71) Applicant: Telefonaktiebolaget LM Ericsson (publ), Stockholm (SE)

(72) Inventors: Bhavinkumar Patel, Malmö (SE); Per Fryking, Lund (SE); Håkan Schang, Förslöv (SE); Jianmin Hou, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 189 days.

(21) Appl. No.: 17/614,741

(22) PCT Filed: Jun. 5, 2019

(86) PCT No.: PCT/EP2019/064569
§ 371 (c)(1),
(2) Date: Nov. 29, 2021

(87) PCT Pub. No.: WO2020/244748
PCT Pub. Date: Dec. 10, 2020

(65) Prior Publication Data
US 2022/0231746 A1    Jul. 21, 2022

(51) Int. Cl.
*H04B 7/06*    (2006.01)
*H04B 7/08*    (2006.01)

(52) U.S. Cl.
CPC .......... *H04B 7/0695* (2013.01); *H04B 7/0617* (2013.01); *H04B 7/088* (2013.01)

(58) Field of Classification Search
CPC ..... H04B 7/0695; H04B 7/0617; H04B 7/088
(Continued)

(56) References Cited

U.S. PATENT DOCUMENTS 9,609,468 B1    3/2017  Moscovich et al.
2012/0270535 A1  10/2012  Chen et al.
(Continued)

FOREIGN PATENT DOCUMENTS

CN    108242948 A    7/2018
CN    108260158 A    7/2018
(Continued)

OTHER PUBLICATIONS

Final Office Action dated Jul. 5, 2023 in connection with U.S. Appl. No. 17/616,775, 17 pages.
(Continued)

*Primary Examiner* — Fitwi Y Hailegiorgis
(74) *Attorney, Agent, or Firm* — Leffler Intellectual Property Law, PLLC

(57) ABSTRACT

A method for wireless communication is disclosed, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection. The method comprises predicting a future trajectory for the user device, and determining the candidate set of beams based on the predicted future trajectory. In some embodiments, determining the candidate set of beams based on the predicted future trajectory comprises giving preference to available beams covering the predicted future trajectory. In some embodiments, determining the candidate set of beams comprises letting a first candidate set of beams associated with a first reliability of the prediction include more available beams not covering the predicted future trajectory than does a second candidate set of beams associated with a second reliability of the prediction when (Continued)

the first reliability is lower than the second reliability. Corresponding apparatus, network node and computer program product are also disclosed.

20 Claims, 2 Drawing Sheets

(58) Field of Classification Search
USPC .......................................................... 375/295
See application file for complete search history.

(56) References Cited

U.S. PATENT DOCUMENTS

| | | |
|---|---|---|
| 2012/0275387 A1 | 11/2012 | Xing et al. |
| 2014/0315546 A1 | 10/2014 | Chen et al. |
| 2014/0323144 A1 | 10/2014 | Kim et al. |
| 2015/0230263 A1* | 8/2015 | Roy ................. H04W 72/51 455/452.2 |
| 2015/0312721 A1 | 10/2015 | Singh |
| 2016/0044462 A1 | 2/2016 | Li et al. |
| 2016/0353327 A1 | 12/2016 | Larsson et al. |
| 2018/0212651 A1 | 7/2018 | Li et al. |
| 2018/0262918 A1 | 9/2018 | Zhao et al. |
| 2018/0352526 A1 | 12/2018 | Frenger et al. |
| 2019/0158162 A1 | 5/2019 | Ryu et al. |
| 2019/0199419 A1* | 6/2019 | Teslenko .............. H04B 7/0617 |
| 2019/0222364 A1 | 7/2019 | Shimoda et al. |
| 2019/0277957 A1 | 9/2019 | Chandrasekhar et al. |
| 2020/0252118 A1 | 8/2020 | Zhang et al. |

FOREIGN PATENT DOCUMENTS

| | | |
|---|---|---|
| EP | 3547575 A1 | 10/2019 |
| KR | 20160143509 A | 12/2016 |
| WO | 2013125993 A1 | 8/2013 |
| WO | 2017140374 A1 | 8/2017 |
| WO | 2017167918 A1 | 10/2017 |
| WO | 2018054498 A1 | 3/2018 |
| WO | 2018072842 A1 | 4/2018 |
| WO | 2018084787 A1 | 5/2018 |
| WO | 2018105069 A1 | 6/2018 |
| WO | 2018125686 A2 | 7/2018 |
| WO | 2018171860 A1 | 9/2018 |
| WO | 2018228519 A1 | 12/2018 |

OTHER PUBLICATIONS

India Office Action dated Jun. 6, 2022 in connection with India Application No. 202147055600, 7 pages.
PCT International Search Report, dated Mar. 6, 2020, in connection with International Application No. PCT/EP2019/064564, all pages.
PCT Written Opinion, dated Mar. 6, 2020, in connection with International Application No. PCT/EP2019/064564, all pages.
PCT International Search Report, dated Jan. 8, 2020, in connection with International Application No. PCT/EP2019/064569, all pages.
PCT Written Opinion, dated Jan. 8, 2020, in connection with International Application No. PCT/EP2019/064569, all pages.
PCT International Search Report, dated Mar. 6, 2020, in connection with International Application No. PCT/EP2019/064567, all pages.
PCT Written Opinion, dated Mar. 6, 2020, in connection with International Application No. PCT/EP2019/064567, all pages.
Notice of Allowance dated Nov. 24, 2023 in connection with U.S. Appl. No. 17/616,775, 14 pages.
Non-Final Office Action issued Feb. 2, 2023 in connection with U.S. Appl. No. 17/616,775, 23 pages.
Hong Zhang and Ali Abdi, "Mobile Speed Estimation Using Diversity Combining in Fading Channels", New Jersey Institute of Technology, IEEE Communications Society, 2004 (Year: 2004), 5 pages.
Non-Final Office Action issued Apr. 1, 2024 in connection with U.S. Appl. No. 17/615,038, 31 pages.

* cited by examiner

DETERMINATION OF CANDIDATE SET OF BEAMS FOR BEAM TRACKING

TECHNICAL FIELD

The present disclosure relates generally to the field of wireless communication. More particularly, it relates to beam tracking for beamformed transmission in wireless communication.

BACKGROUND

In fifth generation (5G) wireless communication, for example, several antenna elements are used in conjunction to create positive and negative interference resulting in communication beams of transmitted energy. This so called beamformed transmission is well known and typically provides advantages such as increased throughput, more efficient utilization of system capacity, etc.

Generally, beam implementation may rely on a pre-defined static grid of beams or on dynamic beams that follow the location of a user device. In either case, a selected beam is used to serve a user device.

When a connected user device moves physically (and thereby also moves virtually within a static grid of beams if applicable), the selected beam may need to be adjusted to continue properly serving the user device. The same applies when the radio environment of a connected user device changes; regardless if the user device moves physically or not. This process is generally known as beam tracking. Adjustment may be selection of another beam (e.g., in the case of a static grid of beams) and/or change of direction of the selected beam (e.g., in the case of a dynamic beam).

To achieve proper operation, beam tracking should typically be performed such that proper service for the user device is enabled. For example, this may put requirements on how often beam tracking is performed and/or which beam directions are considered in the beam tracking process.

On the other hand, beam tracking typically requires use of communication resources (e.g., reference signals of some kind) that cannot be used for other purposes, e.g., communication of data content.

Therefore, there is a need for new approaches to beam tracking. Preferably, such approaches provide proper beam tracking as well as efficient use of communication resources.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It should be noted that even though the description herein uses 5G wireless communication as an example, embodiments may be equally applicable for any wireless communication that apply beamformed communication.

It is an object of some embodiments to solve or mitigate, alleviate, or eliminate at least some of the above or other disadvantages.

A first aspect is a method for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The method comprises predicting a future trajectory for the user device, and determining the candidate set of beams based on the predicted future trajectory.

In some embodiments, determining the candidate set of beams based on the predicted future trajectory comprises determining a size of the candidate set of beams based on the predicted future trajectory.

In some embodiments, determining the candidate set of beams based on the predicted future trajectory comprises giving preference to available beams covering the predicted future trajectory.

In some embodiments, the method further comprises determining a reliability of the prediction, wherein determining the candidate set of beams is further based on the determined reliability.

In some embodiments, determining the candidate set of beams comprises letting a first candidate set of beams associated with a first reliability of the prediction include more available beams not covering the predicted future trajectory than does a second candidate set of beams associated with a second reliability of the prediction when the first reliability is lower than the second reliability.

In some embodiments, predicting the future trajectory comprises one or more of: determining a direction of movement of the user device, and determining a speed of movement of the user device.

In some embodiments, the method further comprises adjusting one or more of a beam tracking measurement frequency, a beam tracking measurement periodicity, a beam tracking measurement period, and a beam tracking measurement interval based on the determined speed of movement of the user device.

In some embodiments, predicting the future trajectory for the user device is based on one or more of: a current location of the user device, a currently selected beam for the user device, previously selected beams for the user device, a beam switch frequency of the user device, information received from a navigation system regarding an ongoing route of the user device, historical and/or statistical data regarding earlier trajectories taken by the user device, and statistical data regarding earlier trajectories taken by other user devices.

In some embodiments, the method further comprises configuring the user device to perform beam tracking measurements for the candidate set of beams.

In some embodiments, the method further comprises transmitting reference signals on the beams of the candidate set of beams.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The apparatus comprises controlling circuitry configured to cause prediction of a future trajectory for the user device, and determination of the candidate set of beams based on the predicted future trajectory.

A fourth aspect is a network node comprising the apparatus of the third aspect.

In some embodiments, any of the above aspects may additionally have features identical with or corresponding to any of the various features as explained above for any of the other aspects.

An advantage of some embodiments is that new approaches to beam tracking are provided.

Another advantage of some embodiments is that proper beam tracking as well as efficient use of communication resources is provided for.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
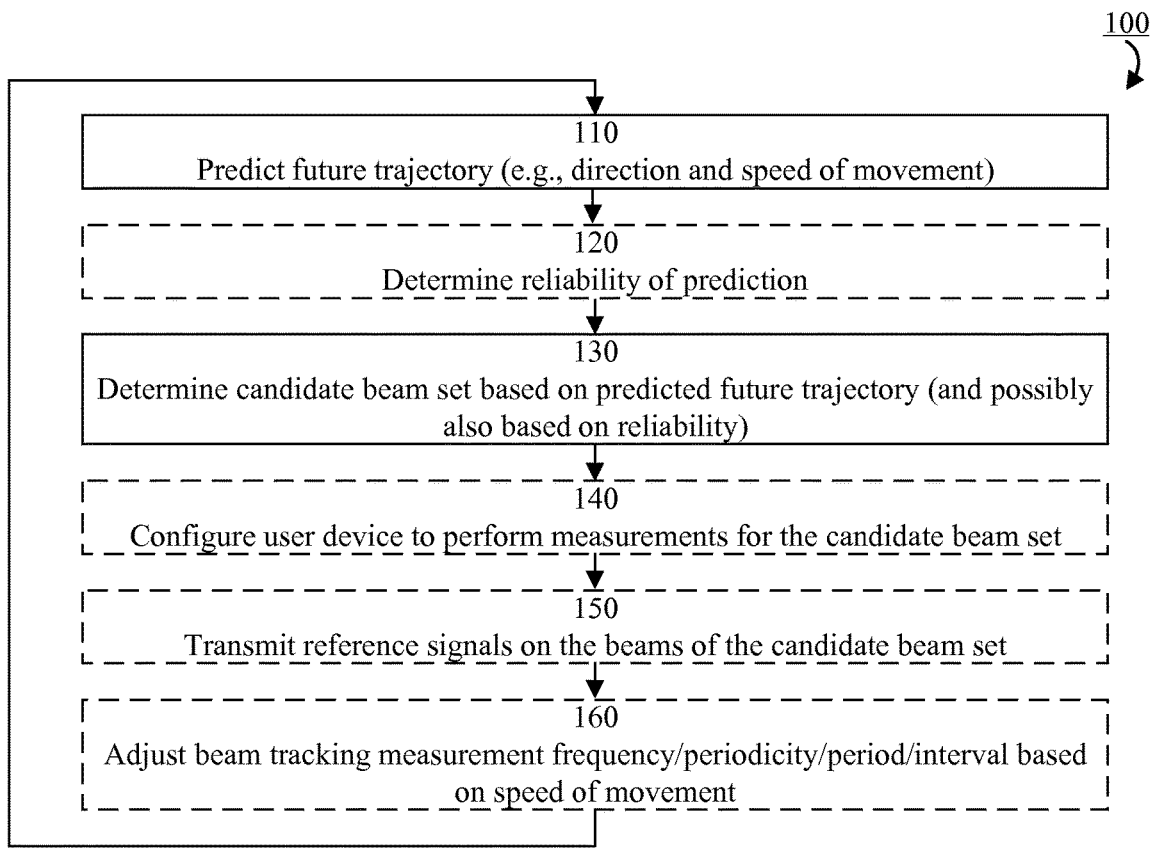
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a selected beam is typically used in beamformed communication to serve a user device (or several user devices in some scenarios). In the wording of the claims, an access node (e.g., a base station, such as a next generation NodeB—gNB) is configured to transmit signals using beamforming to a user device (e.g., a user equipment—UE) using a selected beam of a plurality of available beams. The plurality of available beams may, for example, be a pre-defined static grid of beams. Generally, there may be a plurality of access nodes configured to transmit signals using beamforming to a user device using a selected beam of a respective plurality of available beams.

As is also mentioned before, beam tracking is generally used to adjust the selected beam (e.g., select another beam and/or change a direction of the selected beam) when the user device moves physically, to continue properly serving the user device. For example, beam tracking may involve one or more of: determining whether to select another beam, determining which other beam to select, and determining when to switch to another selected beam.

Typically, beam tracking may be implemented such that, one or more access nodes transmit reference signals (e.g., channel state information reference signals, CSI-RS) on the beams of a candidate set of beams, and the user device performs measurements on the reference signals. In the wording of the claims, beam tracking comprises measurements by the user device on a candidate set of beams of the plurality of available beams, wherein the measurements are for beam selection.

The user device then typically provides a report to at least one access node, wherein the report is indicative of a result of the measurements, the report being for selection of the beam (the selected beam) to use for beamformed communication as described above.

The report may, for example, indicate a desired beam determined by the user device based on the measurements, which may be used by the access node to determine which beam to use as selected beam for the user device. Alternatively or additionally, the report may indicate a channel status (e.g., a channel state information, CSI, and/or a reference signal received power, RSRP) for one or more of the beams, which may be used by the access node to determine which beam to use as selected beam for the user device.

Typically, beams can be very narrow in some scenarios. For instance, around 100 beams may be used to cover a sector with an azimuth of 120 degrees; i.e., each beam is just a few degrees in such scenarios. There is also a concept of wide beams, each of which comprises several narrow beams, which may be used in beam tracking to efficiently determine a set of beams of interest for selection.

To achieve proper operation, beam tracking should typically be performed such that proper service for the user device is enabled. For example, this may put requirements on which beam directions are considered in the beam tracking process (i.e., which beams are included in the candidate set of beams). Typically, the access node determines the candidate set of beams for beam tracking in relation to a user device.

One approach in relation to this may be to determine the candidate set of beams as a collection of beams within a specified distance from the currently selected beams (e.g., neighboring beams). The specified distance may be static; or may be dynamically set based on the mobility of the user device (large specified distance and thereby a large candidate set for high speed user device, and small specified distance and thereby a small candidate set for low speed user device).

Beam tracking typically requires use of communication resources, which thereby cannot be used for other purposes, e.g., communication of data content. Furthermore, beam tracking leads to power usage at the access node (e.g., for transmission of reference signals) and at the user device (e.g., for performing measurements and transmitting report).

The size of the candidate set relates to the use of communication resources and power (the larger the candidate set, the more communication resources and power is required for beam tracking). Thus, it is desirable to keep the candidate set small.

Using a static candidate set determination approach (e.g., static specified distance), the candidate set size typically needs to be configured for a worst case scenario, which leads to an average waste of communication resources and/or power. For example, an operator might stipulate a maximum speed of the user device, above which continuous connection (including successful inter-beam handovers) is not guaranteed. This leads to a candidate set size which fulfills requirements for the worst case scenario of the maximum speed.

In the following, embodiments will be described providing new approaches to beam tracking. In some embodiments, such approaches provide proper beam tracking as well as efficient use of communication resources and/or power.

FIG. 1 illustrates an example method 100 according to some embodiments. The method is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection. The method may, for example, be performed by an access node.

A future trajectory for the user device is predicted in step 110, and the candidate set of beams is determined based on the predicted future trajectory as illustrated in step 130.

A future trajectory for the user device may be defined via a direction of movement of the user device. Alternatively or additionally, a future trajectory for the user device may be defined via a sequence of beams of the plurality of beams, wherein the sequence of beams correspond to probable future locations of the user device.

The future trajectory may be predicted in any suitable way. For example, information may be received from a navigation system regarding an ongoing route of the user device.

Alternatively or additionally, a current location of the user device and/or a currently selected beam for the user device may be used to predict the future trajectory together with historical and/or statistical data regarding earlier trajectories taken by the user device.

From the data regarding earlier trajectories taken by the user device it may be known that, when the user device is at the current location and/or is using the currently selected beam, it is highly likely that the next beam(s) will be in a specific direction from the current location. Alternatively or additionally, it may be known from the data regarding earlier trajectories taken by the user device that, when the user device is at the current location and/or is using the currently selected beam, it is highly likely that the next beam(s) will be in one of two or more specific directions from the current location. An example is when the user device is traveling on a road it often travels on; then it is likely that the next beam(s) will be in either of the two directions of the road.

Alternatively or additionally, a current location of the user device and/or a currently selected beam for the user device may be used to predict the future trajectory together with statistical data regarding earlier trajectories taken by other user devices (and possibly earlier trajectories taken by the user device).

From the statistical data regarding earlier trajectories taken by user devices it may be known that, when a user device is at the current location and/or is using the currently selected beam, it is highly likely that the next beam(s) will be in a specific direction from the current location. Alternatively or additionally, it may be known from the statistical data regarding earlier trajectories taken by user devices that, when a user device is at the current location and/or is using the currently selected beam, it is highly likely that the next beam(s) will be in one of two or more specific directions from the current location. An example is when the user device is at a T-junction; then it is likely that the next beam(s) will be in either of the three directions of the junction.

These approaches may be supported by knowledge regarding previous locations and/or previously selected beams of the user device, e.g., to determine which direction is least likely among two or more specific directions from the current location. For example, knowing that the user device came from one direction to the current location, the likelihood of going back in the opposite direction may be considered lower than the likelihood of continuing in the same direction from the current location.

Generally, predicting the future trajectory for the user device may be based on one or more of a current location of the user device, previous locations of the user device, a currently selected beam for the user device, and previously selected beams for the user device. Locations may, for example, be geographical or physical locations. Geographical locations may, for example, be acquired via a navigation system such as the global positioning system (GPS). In some embodiments, predicting the future trajectory for the user device comprises receiving information from a navigation system regarding an ongoing route of the user device.

Also generally, and additionally or alternatively to the above, predicting the future trajectory for the user device may be based on one or more of historical and/or statistical data regarding earlier trajectories taken by the user device, and statistical data regarding earlier trajectories taken by other user devices. Such data may be kept in one or more of: the user device, the access node, and another network node (e.g., such as a control node and/or a centralized network node). In some embodiments, predicting the future trajectory for the user device comprises receiving data regarding earlier trajectories and/or prediction of the future trajectory for the user device from another node.

The statistical data regarding earlier trajectories taken by user devices may be produced and maintained using any suitable method, e.g., machine learning approaches. Typically for machine learning approaches, the statistical data is trained separately in relation to each cell where it is applicable. Also typically for machine learning approaches, the statistical data is continuously/repeatedly trained (e.g., using so called online training) for maintenance of the statistical data based on historical and/or new data. Thus, the machine learning approach may be based on an online supervised machine learning algorithm. However, other machine learning approaches (e.g., reinforcement learning) may be equally applicable.

For supervised machine learning, a vast amount of historical data for a given cell may be needed, e.g., a collocation of parameters describing the momentary situation of a user device together with corresponding actual outcome in terms of trajectory. This large ensemble of labeled data may be statistically analyzed (e.g., using a neural network, linear regression, polynomial regression, etc.) to determine the most likely future trajectory for a user device under some current momentary situation.

For reinforcement machine learning, operation on each cell using online training may be applied. A state machine (e.g., a Markov decision process) may be used to provide the predicted future trajectory and/or the candidate set of beams. Any outcome in terms of failure (e.g., radio link failure) or success, may then be evaluated in terms of a reward parameter which is fed back to the machine learning process for reinforcement.

Also generally, and additionally or alternatively to the above, predicting the future trajectory for the user device may be based on a beam switch frequency of the user device. For example, the beam switch frequency may be indicative of a speed of movement of the user device. The speed of movement may be seen as a parameter of the future trajectory because it relates to how soon the user device will visit a location of the trajectory.

Other complementary parameters that may be used to predict the future trajectory for the user device include an angle of arrival (AoA), a time of arrival (ToA), and a time difference of arrival (TDoA).

In some embodiments, predicting the future trajectory comprises determining an estimate of a velocity parameter of the user device, such as a direction of movement of the user device and/or determining a speed of movement of the user device.

Determining the estimate of the velocity parameter of the user device may be according to any suitable approach. For example, the velocity parameter of the user device may be estimated based on a timing advance (TA) of the user device and/or based on a reference signal received power (RSRP) for the user device.

Reference signal received power (RSRP) may be measured by the access node on transmitted signals (typically reference signals with a known transmit power). The access node can, for example, request that the user device performs RSRP measurements, e.g., on a beam specific reference signal, and reports the result to the access node.

A high RSRP indicates a short distance between the access node and the user device and a low RSRP indicates a long distance. Typically, the RSRP increases when the user device moves towards the access point and decreases when the user device moves away from the access point. Furthermore, the RSRP typically increases when the user device moves from an edge of a beam towards a midst of a beam and decreases when the user device moves towards an edge of a beam from a midst of a beam.

Timing advance (TA) is a command that the access node may send to the user device to adjust its transmission timing for uplink (UL) transmissions, such that the UL transmissions arrive at the access node in accordance with the timing structure of the access node. A short TA indicates a short distance between the access node and the user device and a long TA indicates a long distance.

The access node typically sends a first TA command (TA instruction) to the user device during the random access procedure, continuously monitors the timing of the user device during a connection session, and sends further TA commands (TA instructions) when needed (e.g., for advance or delay of transmission timing).

The access node may, for example, use the TA instruction for the user device and the RSRP for the user device to conclude whether the user device is stationary (corresponding to a TA instruction to not change the timing or the transmissions—or no TA instruction—and unchanged RSRP), is moving along a beam (i.e., movement away from the access node corresponding to a TA instruction to advance transmissions in time and decreasing RSRP, or movement towards the access node corresponding to a TA instruction to delay transmissions in time and increasing RSRP), or is moving across a beam (corresponding to a TA instruction to not change the timing or the transmissions—or no TA instruction—and increasing or decreasing RSRP).

Regardless of how the future trajectory is predicted and/or how the future trajectory is defined, step 130 comprises determining the candidate set of beams based on the predicted future trajectory.

For example, step 130 may comprise determining a size (e.g., a number of beams) of the candidate set of beams based on the predicted future trajectory. In some embodiments, a larger candidate set of beams may be used for a predicted future trajectory with a relatively high speed of movement than for a predicted future trajectory with a relatively low speed of movement.

Alternatively or additionally, step 130 may comprise determining which beams of the plurality of available beams to include in the candidate set of beams, e.g., by giving preference to available beams covering the predicted future trajectory, meaning that available beams covering the predicted future trajectory are chosen for the candidate set of beams rather than available beams not covering the predicted future trajectory. For example, step 130 may comprise including, in the candidate set of beams, one or more beams covering the predicted future trajectory (e.g., beams being in the determined direction of movement) and/or excluding, from the candidate set of beams, one or more beams not covering the predicted future trajectory (e.g., beams being in a direction which is very different from the determined direction of movement). Thus, depending on the predicted future trajectory, different geometrical forms may be applied for the candidate set of beams according to step 130.

In some embodiments, a reliability of the prediction (e.g., a confidence level of the prediction, a probability density function, a prediction accuracy, and/or a probability that the prediction is correct) is also determined as illustrated in optional step 120. Then, the determination in step 130 of the candidate set of beams may be further based on the determined reliability. In some embodiments, the size of the candidate set of beams and/or which beams are included in the candidate set of beams (the geometrical form) may be determined based on the reliability.

In some embodiments, a larger candidate set of beams may be used for a predicted future trajectory with a relatively low reliability than for a predicted future trajectory with a relatively high reliability.

Alternatively or additionally, determining the candidate set of beams may comprise letting a first candidate set of beams associated with a first reliability of the prediction include more available beams not covering the predicted future trajectory than does a second candidate set of beams associated with a second reliability of the prediction when the first reliability is lower than the second reliability.

In some embodiments, the method may further comprise configuring the user device to perform beam tracking measurements for the candidate set of beams as illustrated in optional step 140, e.g., by transmission of a configuration signal (e.g., comprised in a radio resource control, RRC, message).

The method may typically also comprise performing the beam tracking (e.g., transmitting reference signals and receiving measurement reports) using the adjusted beam tracking measurement frequency/periodicity/period/interval. For example, the method may further comprise transmitting reference signals on the beams of the candidate set of beams as illustrated in optional step 150.

Furthermore, the method may also comprise performing wireless communication using beamforming based on the selected beam that results from the beam tracking, although not shown in FIG. 1.

In some embodiments, a beam tracking measurement frequency/periodicity/period/interval may be adjusted based on the determined speed of movement of the user device as illustrated in optional step 160, and/or based on the determined direction of movement of the user device. Thus, the beam tracking measurement frequency/periodicity/period/interval is dynamically set according to such embodiments.

Generally, the beam tracking measurement frequency/periodicity may be the inverse of a duration in a time domain between one beam tracking measurement occasion and a subsequent beam tracking measurement occasion. The duration may be from the start of the one beam tracking measurement occasion to the start of the subsequent beam tracking measurement occasion, or may be from end of the one beam tracking measurement occasion to the end of the subsequent beam tracking measurement occasion, for example.

For example, adjusting the beam tracking measurement frequency/periodicity may comprise letting a first beam tracking measurement frequency/periodicity associated with a first speed of movement of the user device be lower than a second beam tracking measurement frequency/periodicity associated with a second speed of movement of the user device when the second speed is larger than the first speed. This means that the beam tracking measurements are performed more often when the speed of movement of the user device is relatively high than when the speed of movement of the user device is relatively low.

Alternatively or additionally, adjusting the beam tracking measurement frequency/periodicity may comprise letting a third beam tracking measurement frequency/periodicity associated with a third direction of movement of the user device be lower than a fourth beam tracking measurement frequency/periodicity associated with a fourth direction of movement of the user device when an angle between the third direction and the selected beam is smaller than an angle between the fourth direction and the selected beam. This means that the beam tracking measurements are performed more often when the direction of movement of the user device is across a beam than when the direction of movement of the user device is along a beam.

Generally, the beam tracking measurement interval/period may be a duration in a time domain between one beam tracking measurement occasion and a subsequent beam tracking measurement occasion. The duration may be from the start of the one beam tracking measurement occasion to the start of the subsequent beam tracking measurement occasion, or may be from end of the one beam tracking measurement occasion to the start of the subsequent beam tracking measurement occasion, or may be from end of the one beam tracking measurement occasion to the end of the subsequent beam tracking measurement occasion, for example.

For example, adjusting the beam tracking measurement interval/period may comprise letting a first beam tracking measurement interval/period associated with a first speed of movement of the user device be longer than a second beam tracking measurement interval/period associated with a second speed of movement of the user device when the second speed is larger than the first speed. This means that the beam tracking measurements are performed more often when the speed of movement of the user device is relatively high than when the speed of movement of the user device is relatively low.

Alternatively or additionally, adjusting the beam tracking measurement interval/period may comprise letting a third beam tracking measurement interval/period associated with a third direction of movement of the user device be longer than a fourth beam tracking measurement interval/period associated with a fourth direction of movement of the user device when an angle between the third direction and the selected beam is smaller than an angle between the fourth direction and the selected beam. This means that the beam tracking measurements are performed more often when the direction of movement of the user device is across a beam than when the direction of movement of the user device is along a beam.

As illustrated by the loopback from step 160 to step 110, the method 100 may be repeatedly performed. The repetition may be at some regular time interval and/or triggered by some event (e.g., every beam tracking measurement occasion, when there is a need to free up communication resources, when performance deterioration is detected, etc.).

Figure 2:
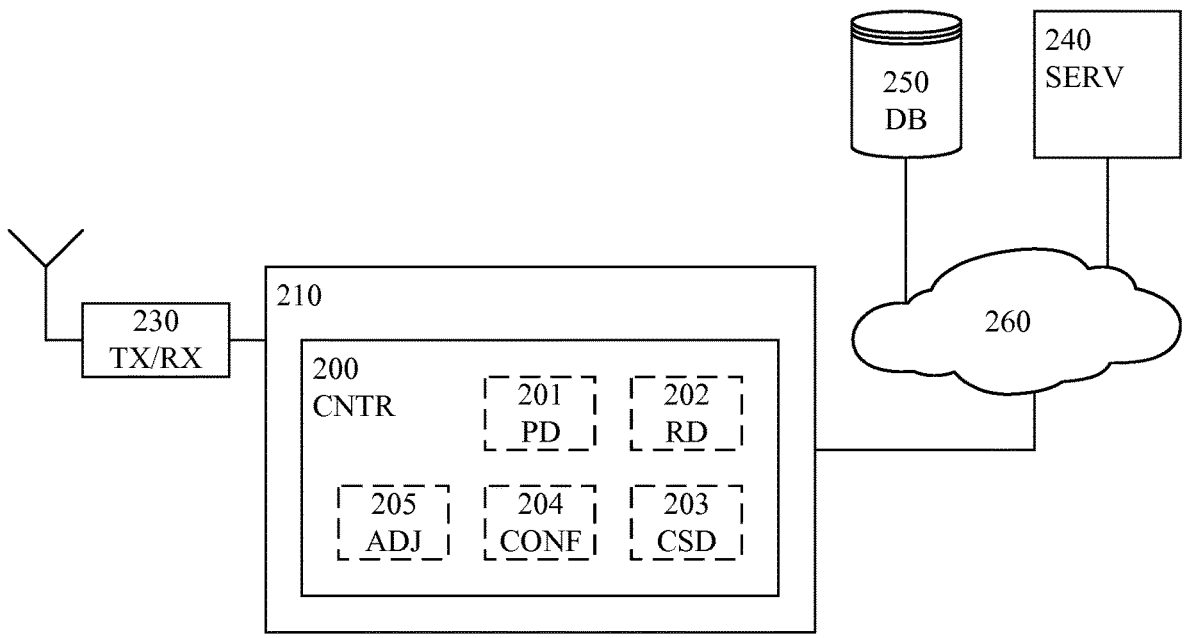
FIG. 2 is a schematic block diagram illustrating an example apparatus according to some embodiments.

FIG. 2 schematically illustrates an example apparatus 210 according to some embodiments. The apparatus is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The apparatus 210 may be comprisable (e.g., comprised) in a network node. The network node may, for example, be an access node such as a base station, or a control node.

The apparatus 210 may, for example, be configured to cause performance of (e.g. configured to perform) one or more of the method steps as described in connection with FIG. 1 or otherwise herein.

The apparatus comprises a controller (CNTR; e.g., controlling circuitry or a controlling module) 200.

The controller is configured to cause prediction of a future trajectory for the user device (compare with step 110 of FIG. 1).

To this end, the controller may comprise, or be otherwise associated with, a predictor (PD; e.g., prediction circuitry or a prediction module) 201. The predictor may be configured to predict the future trajectory for the user device.

The controller is configured to cause determination of the candidate set of beams based on the predicted future trajectory (compare with step 130 of FIG. 1).

To this end, the controller may comprise, or be otherwise associated with, a candidate set determiner (CSD; e.g., candidate set determination circuitry or a candidate set determination module) 203. The candidate set determiner may be configured to determine the candidate set of beams based on the predicted future trajectory.

The controller may also be configured to cause determination of a reliability of the prediction (compare with step 120 of FIG. 2). In such embodiments, the determination of the candidate set of beams may be further based on the determined reliability.

To this end, the controller may comprise, or be otherwise associated with, a reliability determiner (RD; e.g., reliability determination circuitry or a reliability determination module) 202. The reliability determiner may be configured to determine the reliability of the prediction.

The controller may also be configured to cause configuration of the user device to perform beam tracking measurements for the candidate set of beams (compare with step 140 of FIG. 1), e.g., by transmission of a configuration signal.

To this end the controller may comprise, or be otherwise associated with, a configurer (CONF; e.g., configuration circuitry or a configuration module) 204. The configurer may be configured to configure the user device for the adjusted beam tracking measurement frequency/periodicity/period/interval, e.g., by instructing a transmitter (TX; e.g., transmission circuitry or a transmission module—illustrated in FIG. 2 as part of a transceiver, TX/RX) 230 to transmit a configuration signal.

In some implementations, beam tracking measurements on candidate beams are configured in the user device over RRC. An aperiodic measurement configuration may typically comprise:

One or more sets of CSI-RS resources; specifying type of CSI-RS and time/frequency resources for each CSI-RS resource. Each CSI-RS resource is typically transmitted on one candidate beam. Hence, the number of CSI-RS resources may correspond to the size of the candidate set of beam.

One or more report configurations; specifying which CSI-RS resources to measure and how results of the measurements shall be reported.

A set of aperiodic trigger states; connecting a CSI-RS resource set with a report configuration and specifying a spatial reference for each CSI-RS resource in the CSI-RS resource set.

This information may be semi-statically configured in the user device by initial configuration communicated by the access point. The access point may then dynamically request the user device to perform a measurement by including the identity (ID) of a specific aperiodic trigger state in a downlink control information (DCI) message sent on the physical downlink control channel (PDCCH). The user device will know, from the ID and the RRC configuration, which measurement configuration to use and how the CSI-RS resources are transmitted in the time/frequency domain and in the spatial domain.

In the context of some embodiments, the above can be utilized as follows to provide adaptability of the candidate set of beams:

Having multiple CSI-RS resource sets, wherein the number of CSI-RS resources (i.e., the size of the candidate set of beams) may vary between sets.

Having multiple sets of aperiodic trigger states; one set of aperiodic trigger states for each of the CSI-RS resource sets. Each set of aperiodic trigger states may comprise trigger states specifying respective spatial references; corresponding to respective directions in which the candidate sets of beams extend.

For each measurement occasion, the access node may then choose which CSI-RS resource set to use and what aperiodic trigger state to use.

The controller may also be configured to cause (according to any suitable approach) performance of beam tracking using the adjusted beam tracking measurement frequency/periodicity/period/interval and/or performance of wireless communication using beamforming based on the selected beam that results from the beam tracking. For example, the controller may be configured to cause transmission of reference signals on the beams of the candidate set of beams (compare with step 150 of FIG. 1).

To this end the controller may comprise, or be otherwise associated with, a transmitter (TX; e.g., transmission circuitry or a transmission module—illustrated in FIG. 2 as part of a transceiver, TX/RX) 230. The transmitter may be configured to transmit the reference signals on the beams of the candidate set of beams.

The controller may also be configured to cause adjustment of one or more of a beam tracking measurement frequency, a beam tracking measurement periodicity, a beam tracking measurement period, and a beam tracking measurement interval based on the determined speed and/or direction of movement of the user device (compare with step 160 of FIG. 1).

To this end the controller may comprise, or be otherwise associated with, an adjuster (ADJ; e.g., adjustment circuitry or an adjustment module) 205. The adjuster may be configured to adjust the beam tracking measurement frequency/periodicity/period/interval based on the determined speed and/or direction of movement of the user device.

Furthermore, the controller may be operatively connectable (e.g., connected) to a network (illustrated schematically by 260 in FIG. 2). The network may comprise one or more access nodes and/or one or more control nodes. Generally, the controller may be configured to receive, over the network 260, historical and/or statistical data regarding earlier trajectories taken by the user device and/or by other user devices. The historical and/or statistical data may, for example, be stored at a data base (DB) 250 residing in the network, and access to the data base may be administered by a control node such as the server node (SERV) 240 illustrated in FIG. 2.

Figure 3:
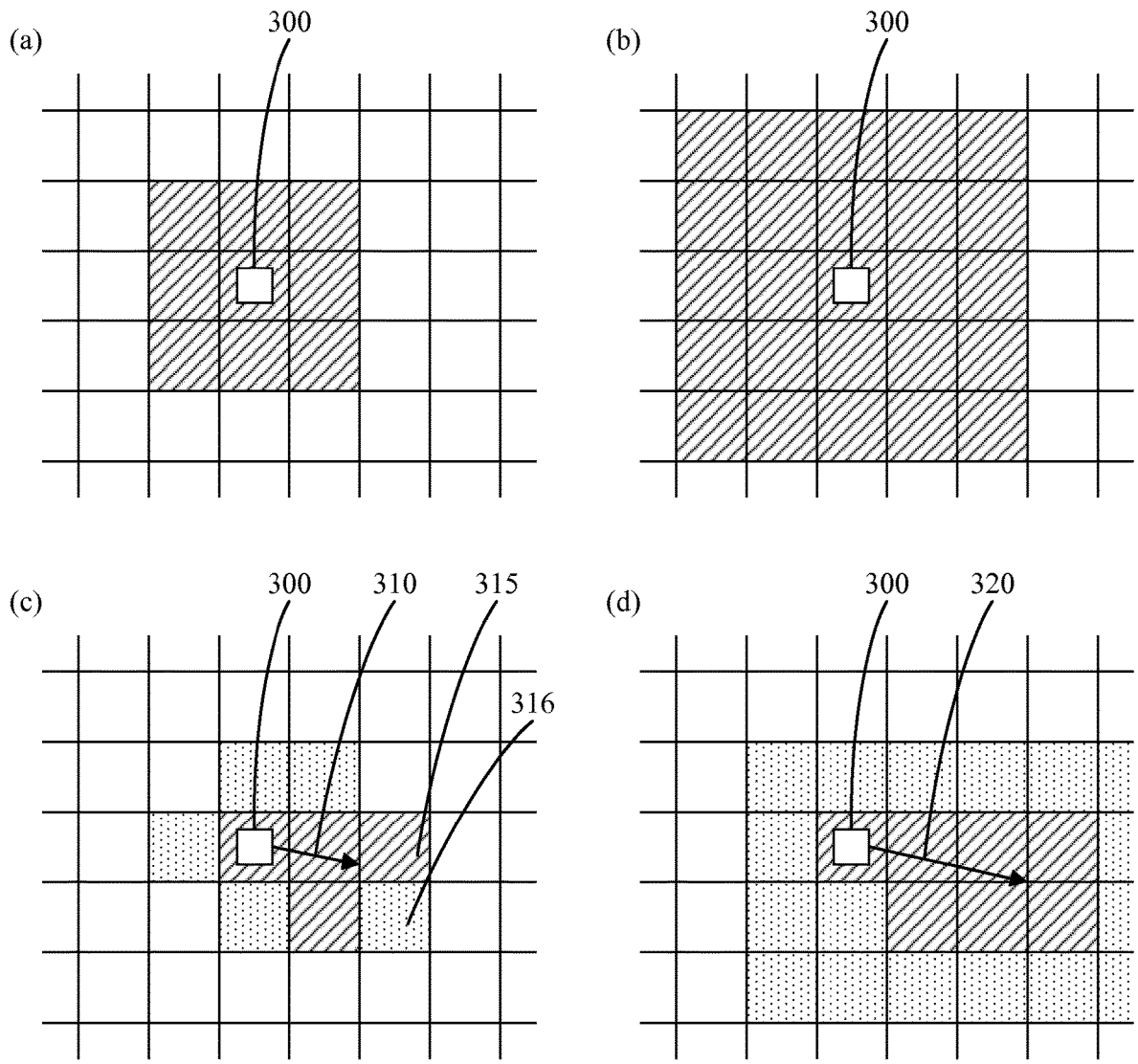
FIG. 3 is a schematic drawing illustrating example candidate sets according to some embodiments.

FIG. 3 schematically illustrates example candidate sets of beams for a user device 300 in four different scenarios according to some embodiments. The gridlines represent borders between beams.

In scenario (a) the user device is in low speed mode (e.g., stationary or nearly stationary). Then, a small candidate set of beams (illustrated by striped beams) may be sufficient for proper beam tracking.

In scenario (b) the user device is in high speed mode. Then, a large candidate set of beams (illustrated by striped beams) may be needed for proper beam tracking. As mentioned before, a large candidate set of beams has the drawbacks of using many communication resources and/or much power. Therefore, it may be beneficial to reduce the candidate set of beams illustrated in scenario (b), if possible (e.g., according to the principles of scenarios (c) and/or (d). However, if no direction of movement or other future trajectory prediction can be determined, or if the future trajectory prediction is unreliable, a candidate set of beams according to scenario (b) may be applicable according to some embodiments.

In scenario (c) the user device has a direction of movement as indicted by 310 and the speed of movement is low. Then, instead of using the candidate set of beams of scenario (a), a candidate beam set (illustrated by striped beams) having only beams in the approximate direction of movement may be applied. This set has the advantage over that of scenario (a) that it comprises fewer beams while still providing proper beam tracking. In fact, the beam tracking may be improved compared to scenario (a) since the rather likely future beam 315 is included in the candidate set of beams of scenario (c). If the future trajectory prediction is not very reliable, an enlarged candidate beam set (illustrated by striped and dotted beams) may be applied, which has more beams in the approximate direction of movement than in other directions. This set comprises the same number of beams as that of scenario (a) while typically providing improved beam tracking compared to scenario (a) since the rather likely future beams 315, 316 are included in the candidate set of beams of scenario (c).

In scenario (d) the user device has a direction of movement as indicted by 320 and the speed of movement is high. Then, instead of using the candidate set of beams of scenario (b), a candidate beam set (illustrated by striped beams) having only beams in the approximate direction of movement may be applied. This set has the advantage over that of scenario (b) that it comprises much fewer beams while still providing proper beam tracking. In fact, the beam tracking may be improved compared to scenario (b) since more of the rather likely future beams are included in the candidate set of beams of scenario (d) than in scenario (b). If the future trajectory prediction is not very reliable, an enlarged candidate beam set (illustrated by striped and dotted beams) may be applied, which has more beams in the approximate direction of movement than in other directions. This set also has fewer beams than that of scenario (b) while typically providing improved beam tracking compared to scenario (b) since more of the rather likely future beams are included in the candidate set of beams of scenario (d) than in scenario (b).

Thus, scenarios (a)-(d) illustrate some examples of how the candidate set of beams may be varied, in size and/or geometrical form, based on predicted future trajectory (e.g., speed and/or direction of movement) and reliability of the prediction.

Generally, it should be noted that—even though direction of movement is used as a typical parameter defining the trajectory—any trajectory parameter may be applicable according to the embodiments herein. For example, a trajectory may be defined by a path through geographical locations and/or by a path through beams.

Also generally, directions and beam coverage should be understood to be in any number of spatial dimensions (e.g., azimuth, elevation, and distance from access node), even if illustrated in the drawings as two-dimensional.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 4:
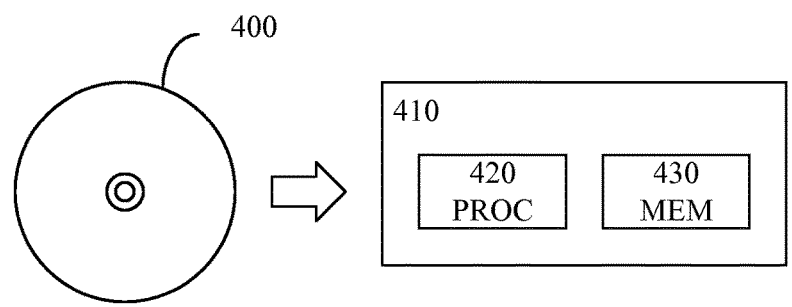
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit) 420, which may, for example, be comprised in a network node 410. When loaded into the data processor, the computer program may be stored in a memory (MEM) 430 associated with or comprised in the data processor. According to some embodiments, the computer program may, when loaded into and run by the data processor, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, the method comprising:
   predicting a future trajectory for the user device;
   determining a reliability of the prediction; and
   determining the candidate set of beams based on the predicted future trajectory and the determined reliability of the prediction,
   wherein predicting the future trajectory comprises determining a speed of movement of the user device, and
   wherein the method further comprises adjusting one or more of a beam tracking measurement frequency, a beam tracking measurement periodicity, a beam tracking measurement period, and a beam tracking measurement interval based on the determined speed of movement of the user device.

2. The method of claim 1, wherein determining the candidate set of beams based on the predicted future trajectory comprises determining a size of the candidate set of beams based on the predicted future trajectory, and the reliability of the predicted future trajectory.

3. The method of claim 1, wherein determining the candidate set of beams based on the predicted future trajectory comprises giving preference to available beams covering the predicted future trajectory.

4. The method of claim 1, wherein determining the candidate set of beams comprises letting a first candidate set of beams associated with a first reliability of the prediction include more available beams not covering the predicted future trajectory than does a second candidate set of beams associated with a second reliability of the prediction when the first reliability is lower than the second reliability.

5. The method of claim 1, wherein predicting the future trajectory comprises determining a direction of movement of the user device.

6. The method of claim 1, wherein predicting the future trajectory for the user device is based on one or more of:
 a current location of the user device;
 a currently selected beam for the user device;
 previously selected beams for the user device;
 a beam switch frequency of the user device;
 information received from a navigation system regarding an ongoing route of the user device;
 historical and/or statistical data regarding earlier trajectories taken by the user device; and
 statistical data regarding earlier trajectories taken by other user devices.

7. The method of claim 1, further comprising configuring the user device to perform beam tracking measurements for the candidate set of beams.

8. The method of claim 1, further comprising transmitting reference signals on the beams of the candidate set of beams.

9. A computer program product comprising a non-transitory computer readable medium, having thereon a computer program comprising program instructions, the computer program being loadable into a data processing unit and configured to cause execution of a method when the computer program is run by the data processing unit, wherein the method is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, and wherein the method comprises:
 predicting a future trajectory for the user device;
 determining a reliability of the prediction; and
 determining the candidate set of beams based on the predicted future trajectory and the determined reliability of the prediction,
 wherein predicting the future trajectory comprises determining a speed of movement of the user device, and
 wherein the method further comprises adjusting one or more of a beam tracking measurement frequency, a beam tracking measurement periodicity, a beam tracking measurement period, and a beam tracking measurement interval based on the determined speed of movement of the user device.

10. An apparatus for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, the apparatus comprising controlling circuitry configured to cause:
 prediction of a future trajectory for the user device;
 determination of a reliability of the prediction; and
 determination of the candidate set of beams based on the predicted future trajectory and the determined reliability of the prediction,
 wherein causing prediction of the future trajectory comprises causing a determination of a speed of movement of the user device, and
 wherein the controlling circuitry is further configured to cause adjustment of one or more of a beam tracking measurement frequency, a beam tracking measurement periodicity, a beam tracking measurement period, and a beam tracking measurement interval based on the determined speed of movement of the user device.

11. The apparatus of claim 10, wherein the controlling circuitry is configured to cause the determination of the candidate set of beams based on the predicted future trajectory by causing determination of a size of the candidate set of beams based on the predicted future trajectory and the reliability of the predicted future trajectory.

12. The apparatus of claim 10, wherein determination of the candidate set of beams based on the predicted future trajectory comprises giving preference to available beams covering the predicted future trajectory.

13. The apparatus of claim 10, wherein determination of the candidate set of beams based on the predicted future trajectory comprises letting a first candidate set of beams associated with a first reliability of the prediction include more available beams not covering the predicted future trajectory than does a second candidate set of beams associated with a second reliability of the prediction when the first reliability is lower than the second reliability.

14. The apparatus of claim 10, wherein the controlling circuitry is configured to cause the prediction of the future trajectory by causing determination of a direction of movement of the user device.

15. The apparatus of claim 10, wherein the controlling circuitry is further configured to cause adjustment of one or more of a beam tracking measurement frequency, a beam tracking measurement periodicity, a beam tracking measurement period, and a beam tracking measurement interval based on the determined speed of movement of the user device.

16. The apparatus of claim 10, wherein the prediction of the future trajectory for the user device is based on one or more of:
 a current location of the user device;
 a currently selected beam for the user device;
 previously selected beams for the user device;
 a beam switch frequency of the user device;
 information received from a navigation system regarding an ongoing route of the user device;
 historical and/or statistical data regarding earlier trajectories taken by the user device; and
 statistical data regarding earlier trajectories taken by other user devices.

17. The apparatus of claim 10, wherein the controlling circuitry is further configured to cause configuration of the user device to perform beam tracking measurements for the candidate set of beams.

18. The apparatus of claim 10, wherein the controlling circuitry is further configured to cause transmission of reference signals on the beams of the candidate set of beams.

19. A network node comprising the apparatus of claim 10.

20. The network node of claim 19, wherein the network node is a control node or an access node.

* * * * *